3,379,721
PROCESS OF TREATING WATER-SOLUBLE ALKALI METAL SALTS OF CMC AND PRODUCT
Albert R. Reid, Wilmington, Del., assignor to Hercules Incorporated, a corporation of Delaware
No Drawing. Filed Oct. 12, 1964, Ser. No. 403,395
6 Claims. (Cl. 260—232)

The present invention relates to a process for substantially increasing the thickening power of water-soluble alkali metal salts of CMC and to the resulting products.

Although the present invention relates to treating any water-soluble alkali metal salt of CMC, e.g. sodium CMC and potassium CMC, for the sake of simplicity and clarity the present invention will be described for the most part hereinafter with reference to sodium CMC.

It has been found in accordance with the present invention that heating a water-soluble alkali metal salt of CMC in solid form either in vacuo or in the presence of air substantially increases the thickening power of the alkali metal salt of CMC. This thickening power is determined by preparing an aqueous solution of the heated alkali metal salt of CMC, measuring the viscosity of the resulting solution and comparing this viscosity with the viscosity of an identical aqueous solution of the same but unheated CMC.

The viscosity of polymer solutions is dependent on the degree of polymerization (D.P.) of the polymer. With CMC the D.P. is limited by the molecular weight of the cellulose furnish used in the preparation and by the amount of exposure to oxidizing and hydrolyzing agents during manufacture. It would be advantageous to increase the molecular weight over and above the highest D.P. possible from the current methods of manufacture, thereby effectively increasing the viscosity of aqueous CMC solutions, and thus the thickening power of CMC.

By far the major use of CMC is the use as a thickening agent for numerous materials. For instance, CMC is used as a thickening agent in fire fighting compositions, oil well fracturing fluids, oil well flooding compositions, cosmetics, pharmaceuticals and food formulations.

It has been found in accordance with the present invention that heating a water-soluble alkali metal salt of CMC in solid form either in vacuo or in the presence of air substantially increases the solution viscosity thereof. More specifically it has been found in accordance with the present invention that the thickening power of water-soluble alkali metal salts of CMC having a D.S. of about 0.6–1.5 is substantially increased by subjecting same in a substantially dry form to a temperature of about 100° C.– 200° C. for up to about 24 hours either in vacuo or in the presence of air.

The designation "D.S." as used herein means the average number of hydroxyl groups substituted in the cellulose per anhydroglycose unit. The maximum possible D.S. of alkali metal salts of CMC is three.

The following examples, wherein percent is by weight unless otherwise indicated, illustrate specific embodiments of the present invention. However, these examples are not intended to limit the scope of the present invention as defined in the appended claims. All viscosities herein were measured with a standard Brookfield Synchro-Lectric LVF viscometer on 1% aqueous solutions at 25° C. All the sodium CMC used herein was prepared in accordance with the aqueous alcohol slurry process described and claimed in Klug & Tinsley U.S. Patent No. 2,517,577. Various types of sodium CMC as to D.S. and as to viscosity were employed in each of the examples in Table 1 hereinafter wherein dry (about 5% water) sodium CMC was divided into several equal portions. One portion was used as a control, i.e. it was not heated. The other portions were heated under the conditions set forth in Table 1 hereinafter. The viscosity of a 1% aqueous solution of each portion was measured in order to determine the effect of the process of the present invention on the thickening power of the sodium CMC. Further details appear in Table 1 hereinafter.

TABLE 1

| Example No. | NaCMC D.S. | Heating Condition ||| Visc., cps. | Percent Visc.[1] Increase | Solution Appearance |
|---|---|---|---|---|---|---|---|
| | | Temp.,° C. | Time | Type | | | |
| 1 | 0.8 | Control | | | 1,440 | | A |
| 2 | 0.8 | 130 | 2 hrs | Vacuo | 2,400 | 67 | B |
| 3 | 0.8 | 130 | 2 hrs | Air | 2,500 | 74 | B |
| 4 | 0.8 | 130 | 6 hrs | Air | 2,000 | 40 | B |
| 5 | 0.9 | Control | | | 205 | | A |
| 6 | 0.9 | 130 | 2 hrs | Air | 450 | 130 | B |
| 7 | 0.9 | 130 | 4 hrs | Air | 355 | 74 | B |
| 8 | 1.2 | Control | | | 84 | | A |
| 9 | 1.2 | 130 | 2 hrs | Air | 145 | 73 | A |
| 10 | 1.2 | 130 | 4 hrs | Air | 175 | 109 | A |
| 11 | 1.2 | 130 | 6 hrs | Air | 195 | 132 | A |
| 12 | 0.8 | Control | | | 1,100 | | A |
| 13 | 0.8 | 100 | 24 hrs | Air | 1,560 | 42 | B |
| 14 | 0.8 | 150 | 5 mins | Air | 1,280 | 16 | A |
| 15 | 0.8 | 150 | 10 mins | Air | 1,600 | 45 | B |
| 16 | 0.8 | 150 | 15 mins | Air | 1,660 | 51 | B |
| 17 | 0.8 | 175 | 5 mins | Air | 1,600 | 45 | B |

[1] Percent viscosity increase=100(x−y)/y, where x is viscosity of heated NaCMC and y is viscosity of control.
A=clear with no structure. B=clear with some structure.

Although a number of the conditions of the process of the present invention are critical, one skilled in the art will appreciate that the invention can be practiced outside the scope of the foregoing examples. Although the time and temperature of heating are not critical, they are quite important. Good results are obtained by operating within the range of about 100° C.–200° C. for up to about 24 hours, preferably about 120° C.–140° C., for up to about 6 hours in air and for up to about 3 hours in vacuo. Time and temperature vary inversely, and as will be noted at any given temperature the time required is less when the process is carried out in vacuo than when carried out in the presence of air. While the process can be carried out at a temperature below 100° C., it renders the process less attractive commercially because of the longer time required in order to obtain the maximum increase in thickening power. Likewise a temperature above 200° C. can be used but this is not desirable because of some risk of carrying the process too far even at very short periods of time and thereby degrading the product somewhat. However, at the higher temperatures only very short periods of time are needed, e.g. about 1–2 minutes at 200° C., whereas at 100° C. the time required may be as long as about 24 hours.

The D.S. of the water-soluble alkali metal salts of CMC applicable in the present invention must be at least about 0.6. Although applicant is not sure of the reason, since he is not positive of the mechanism of the process of the present invention, the thickening power of water-soluble alkali metal salts of CMC having a D.S. below about 0.6 is not increased appreciably by the present invention. Although a D.S. above 1.5 is applicable, it is of less interest because most of the water-soluble alkali metal salts of CMC presently available commercially fall within the range of about 0.6–1.5.

The advantages of this invention are quite apparent. In the large number of applications where water-soluble alkali metal salts of CMC are used as thickeners, it is obviously desirable to increase their thickening power. In many such applications it is also a distinct advantage to be able to substantially increase this thickening power merely by heating under the controlled conditions hereinbefore defined instead of having to react the water-soluble alkali metal salts of CMC with other materials. In many instances, such as in foods, the reagents used to increase the thickening power would not be permitted for use in foods.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process for substantially increasing the thickening power of water-soluble alkali metal salts of carboxymethylcellulose having a D.S. of about 0.6–1.5 which comprises subjecting said alkali metal salts of carboxymethylcellulose in a substantially dry form to a temperature of about 100° C.–200° C. for up to about 24 hours.

2. Process for substantially increasing the thickening power of water-soluble alkali metal salts of carboxymethylcellulose having a D.S. of about 0.6–1.5 which comprises subjecting said alkali metal salts of carboxymethylcellulose in a substantially dry form to a temperature of about 100° C.–200° C. for up to about 2 minutes to 24 hours.

3. Process for substantially increasing the thickening power of water-soluble alkali metal salts of carboxymethylcellulose having a D.S. of about 0.6–1.5 which comprises subjecting said alkali metal salts of carboxymethylcellulose in a substantially dry form to a temperature of about 120° C.–140° C. for up to about 6 hours.

4. Process for substantially increasing the thickening power of water-soluble sodium carboxymethylcellulose having a D.S. of about 0.6–1.5 which comprises subjecting said sodium carboxymethylcellulose in a substantially dry form to a temperature of about 100° C.–200° C. for up to about 24 hours.

5. Process for substantially increasing the thickening power of water-soluble alkali metal salts of carboxymethylcellulose having a D.S. of about 0.6–1.5 which comprises subjecting said alkali metal salts of carboxymethylcellulose in a substantially dry form to a temperature of about 120° C.–140° C. in the presence of air for up to about 6 hours.

6. Process for substantially increasing the thickening power of water-soluble alkali metal salts of carboxymethylcellulose having a D.S. of about 0.6–1.5 which comprises subjecting said alkali metal salts of carboxymethylcellulose in a substantially dry form to a temperature of about 120° C.–140° C. in vacuo for up to about 3 hours.

References Cited

UNITED STATES PATENTS

| | | | |
|---|---|---|---|
| 3,106,551 | 10/1963 | Lindenfors | 260—232 |
| 3,017,237 | 1/1962 | Bullock et al. | 260—231 XR |
| 2,766,137 | 10/1956 | Ashton et al. | 260—231 XR |

DONALD E. CZAJA, *Primary Examiner.*

L. J. BERCOVITZ, *Examiner.*

R. W. MULCAHY, *Assistant Examiner.*